United States Patent
Lee et al.

(10) Patent No.: US 8,340,671 B2
(45) Date of Patent: Dec. 25, 2012

(54) METHOD AND APPARATUS OF PERFORMING CELL RESELECTION PROCEDURE IN WIRELESS COMMUNICATION SYSTEM

(75) Inventors: Ji Woong Lee, Anyang-si (KR); Chul Hoi Koo, Anyang-si (KR); Yung-Mi Kim, Anyang-si (KR); Jin Sook Ryu, Anyang-si (KR); Hyounhee Koo, Anyang-si (KR)

(73) Assignee: LG Electronics Inc., Seoul (KR)

(*) Notice: Subject to any disclaimer, the term of this patent is extended or adjusted under 35 U.S.C. 154(b) by 484 days.

(21) Appl. No.: 12/585,297

(22) Filed: Sep. 10, 2009

(65) Prior Publication Data
US 2010/0093356 A1 Apr. 15, 2010

(30) Foreign Application Priority Data
Oct. 13, 2008 (KR) .................. 10-2008-0100180

(51) Int. Cl.
*H04W 4/00* (2009.01)
(52) U.S. Cl. ........... 455/435.3; 455/437; 455/436; 455/552.1; 455/502; 455/524; 370/252; 370/331; 370/235; 370/332; 370/328
(58) Field of Classification Search ............. 370/328, 370/395.21; 455/437, 435.3, 436, 552.1, 455/502, 524, 434
See application file for complete search history.

(56) References Cited

U.S. PATENT DOCUMENTS

| | | | | |
|---|---|---|---|---|
| 7,428,217 B2* | 9/2008 | Kobayashi et al. | ........... | 370/235 |
| 7,940,727 B2* | 5/2011 | Kim et al. | .............. | 370/332 |
| 2002/0006805 A1* | 1/2002 | New et al. | .............. | 455/525 |
| 2002/0082017 A1* | 6/2002 | Hattori | .................... | 455/436 |
| 2005/0079870 A1* | 4/2005 | Rick et al. | .............. | 455/437 |
| 2008/0102847 A1* | 5/2008 | Kim et al. | .............. | 455/450 |
| 2008/0310370 A1* | 12/2008 | Kitani | ................... | 370/331 |
| 2010/0029274 A1* | 2/2010 | Deshpande et al. | ........ | 455/435.3 |
| 2010/0046385 A1* | 2/2010 | Kamei et al. | ............. | 370/252 |

* cited by examiner

*Primary Examiner* — Rafael Perez-Gutierrez
*Assistant Examiner* — Joseph Arevalo
(74) *Attorney, Agent, or Firm* — McKenna Long & Aldridge LLP

(57) ABSTRACT

A method and an apparatus of performing a cell reselection procedure in a wireless communication system are provided. The method includes starting a first reselection timer if a signal property value of a first neighbor cell with a higher priority than a serving cell is increased to above a threshold, starting a first delay timer if a second reselection timer that is a reselection timer of a second neighbor cell with a higher priority than the first neighbor cell is running at the expiry of the first reselection timer, reselecting the second neighbor cell as a suitable cell if the second reselection timer expires before the expiry of the first delay timer, and reselecting the first neighbor cell as the suitable cell if the first delay timer expires before the expiry of the second reselection timer.

10 Claims, 14 Drawing Sheets

METHOD AND APPARATUS OF PERFORMING CELL RESELECTION PROCEDURE IN WIRELESS COMMUNICATION SYSTEM

CROSS-REFERENCE TO RELATED APPLICATIONS

This application claims the benefit of priority of Korean Patent Application No. 2008-0100180 filed on Oct. 13, 2008 which is incorporated by reference in its entirety herein.

BACKGROUND OF THE INVENTION

1. Field of the Invention

The present invention relates to wireless communications, and more particularly, to a method and an apparatus of performing a cell reselection procedure in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Wireless communication systems are designed for the purpose of providing reliable communication to a plurality of users irrespective of users' locations and mobility.

To overcome a restriction on a service area and a limitation in a user capacity, the wireless communication system provides a communication service by dividing the service area into a plurality of cells. This is referred to as a multi-cell environment. A cell selection procedure is a procedure in which a user equipment (UE) selects a cell to receive a service. The purpose of cell selection is to register the UE to a network in order to receive the service from a base station (BS). In general, the UE selects a cell having a strongest signal property value by performing a signal measurement process with respect to the BS in all searchable frequency bands. The cell selected by the UE is referred to as a serving cell. A cell adjacent to the serving cell is referred to as a neighbor cell. A difference between the wireless communication system and a wire communication system lies in that the wireless communication system has to provide a seamless service to the UE with mobility. If the UE moves from one place to another, it may be inappropriate to receive the service from the serving cell. In this case, the UE reselects a suitable cell capable of maintaining quality of service (QoS) and receiving a signal with better quality. This is referred to as a cell reselection procedure. The cell reselection procedure is to select a more suitable cell based on criteria for cell reselection and signal measurement in an idle state. The UE may request the network to provide the service or may wait in the idle state to receive the service from the network. In the idle state, the UE repeats a process of reselecting a cell having a better signal property by measuring signals from the serving cell and the neighbor cell. For the UE with mobility, the cell reselection procedure is important in order to receive a service with better quality.

The neighbor cell may be a radio access technology (RAT) cell different from the serving cell. An RAT is a type of technology used in radio access. Examples of the RAT include a global system for mobile communication (GSM)/general packet radio service (GPRS), a universal mobile telecommunications system (UMTS) terrestrial radio access network (UTRAN), an evolved-UTRAN (E-UTRAN), and so on. In addition thereto, there are various RATs.

The GSM is a radio technology which has been developed as a standardized system for wireless communication systems in Europe. The GPRS was introduced to provide packet switched data services in circuit switched data services provided by the GSM. The GSM/GPRS is a system based on time division multiple access (TDMA). The GSM/GPRS may be referred to as a $2^{nd}$ generation wireless communication system. The UMTS may be referred to as a $3^{rd}$ generation wireless communication system based on wideband code division multiple access (WCDMA). The E-UTRAN is a wireless communication system based on orthogonal frequency division multiple access (OFDMA). The E-UTRAN is also referred to as long term evolution (LTE). A GSM cell is a cell using the GSM/GPRS as the RAT. A UTRAN cell is a cell using the UMTS as the RAT. An E-UTRAN cell is a cell using the E-UTRAN as the RAT.

The introduction of various types of RATs results in a problem in the interoperation between the existing GSM/GPRS and a new RAT such as the UMTS. The new RAT preferably maintains backward compatibility with the existing GSM/GPRS in terms of user convenience, and this is also advantageous for a service provider since existing equipment can be reused. For the interoperation between different RATs, the UE may support multi-RAT. The UE supporting the multi-RAT may reselect an RAT cell different from the serving cell. For example, if the serving cell is a GSM/GPRS cell, the UE may reselect a neighbor UMTS cell, E-UTRAN cell, and so on.

Accordingly, there is a need to provide a method and an apparatus of effectively performing a cell reselection procedure if neighbor cells are various types of RAT cells.

SUMMARY OF THE INVENTION

The present invention provides a method and an apparatus of performing an effective cell reselection procedure.

In an aspect of, a method of performing a cell reselection procedure in a wireless communication system, carried in a user equipment (UE) is provided. The method includes starting a first reselection timer if a signal property value of a first neighbor cell with a higher priority than a serving cell is increased to above a threshold, starting a first delay timer if a second reselection timer that is a reselection timer of a second neighbor cell with a higher priority than the first neighbor cell is running at the expiry of the first reselection timer, reselecting the second neighbor cell as a suitable cell if the second reselection timer expires before the expiry of the first delay timer, and reselecting the first neighbor cell as the suitable cell if the first delay timer expires before the expiry of the second reselection timer.

The method may further include reselecting the first neighbor cell as the suitable cell if a signal property value of the second neighbor cell is less than the threshold while the second reselection timer is running.

The method may further include starting a second delay timer if a third reselection timer that is a reselection timer of a third neighbor cell with a higher priority than the second neighbor cell is running at the expiry of the second reselection timer.

Preferably, the first reselection timer and the second reselection timer have the same interval.

Preferably, an interval of the first delay timer is determined according to a priority of the first neighbor cell.

Preferably, information on the priority is provided by a network.

Preferably, the priority is a priority among different radio access technologies (RATs), the RATs which are technology types used in radio access, or a priority among frequencies in the same RAT.

Preferably, an interval of the second delay timer is shorter than an interval of the first delay timer.

Preferably, the RAT is any one of a global system for mobile communication (GSM)/general packet radio service (GPRS), a universal mobile telecommunications system (UMTS) terrestrial radio access network (UTRAN), and evolved-UTRAN (E-UTRAN).

Preferably, the RAT of the serving cell is the GSM/GPRS.

In another aspect, an apparatus for a wireless communication is provided. The apparatus includes a radio frequency (RF) unit transmitting and/or receiving a radio signal, and a processor coupled with the RF unit and configured to start a first reselection timer if a signal property value of a first neighbor cell with a higher priority than a serving cell is increased to above a threshold, start a first delay timer if a second reselection timer that is a reselection timer of a second neighbor cell with a higher priority than the first neighbor cell is running at the expiry of the first reselection timer, reselect the second neighbor cell as a suitable cell if the second reselection timer expires before the expiry of the first delay timer, and reselect the first neighbor cell as the suitable cell if the first delay timer expires before the expiry of the second reselection timer.

A method and an apparatus of effectively performing a cell reselection procedure are provided. Therefore, overall system performance can be improved.

DESCRIPTION OF EXEMPLARY EMBODIMENTS

Figure 1:
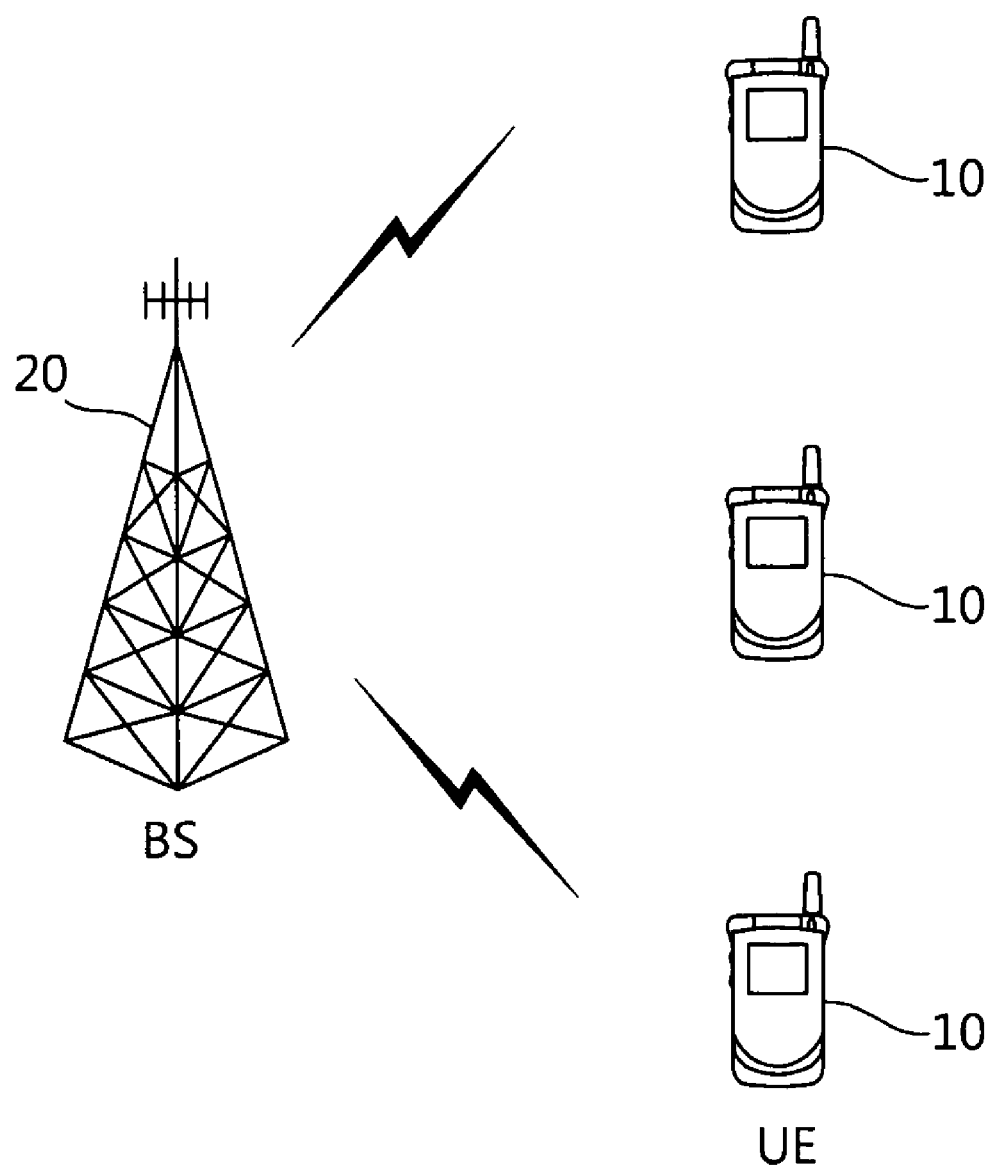
FIG. 1 is a block diagram showing a wireless communication system.

FIG. 1 is a block diagram showing a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. The BS 20 may provide a communication service to at least one cell. The cell is a region in which the BS 20 provides the communication service.

Hereinafter, a downlink denotes communication from the BS to the UE, and an uplink denotes communication from the UE to the BS. In the downlink, a transmitter may be a part of the BS, and a receiver may be a part of the UE. In the uplink, the transmitter may be a part of the UE, and the receiver may be a part of the BS.

There is no restriction on a duplex scheme. A time division duplex (TDD) scheme, a frequency division duplex (FDD) scheme, or a half-duplex FDD (H-FDD) scheme may be selected as the duplex scheme. In the TDD scheme, uplink transmission and downlink transmission are performed at different times while occupying the same frequency band. In the FDD scheme, uplink transmission and downlink transmission are simultaneously performed while occupying different frequency bands. In the H-FDD scheme, uplink transmission and downlink transmission cannot be simultaneously performed while occupying different frequency bands. That is, in the H-FDD scheme, uplink transmission and downlink transmission are performed at different times in different frequency bands.

The wireless communication system may be not only a multiple input multiple output (MIMO) system or a multiple input single output (MISO) system but also a single input single output (SISO) system or a single input multiple output (SIMO) system.

There is no restriction on a multiple access scheme. As the multiple access scheme, various multiple access schemes can be selected such as well-known time division multiple access (TDMA), frequency division multiple access (FDMA), code division multiple access (CDMA), single carrier-frequency division multiple access (SC-FDMA), or orthogonal frequency division multiplexing access (OFDMA). The wireless communication system can use different multiple access schemes in uplink and downlink transmissions. For example, the SC-FDMA may be used in uplink transmission, and the OFDMA may be used in downlink transmission.

Figure 2:
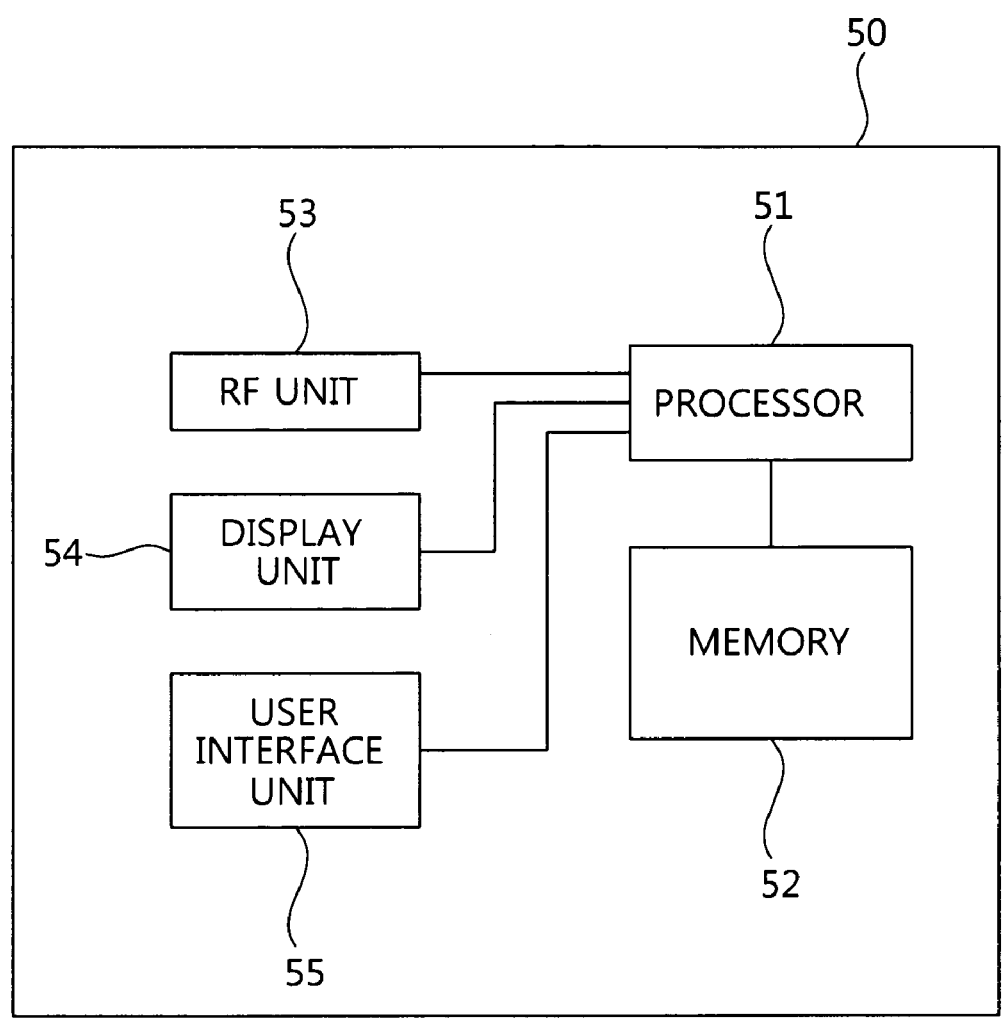
FIG. 2 is a block diagram showing an apparatus for a wireless communication.

FIG. 2 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement functions, procedures to be proposed below and/or methods described below in this description. Layers of the radio interface protocol may be implemented in the processor 51. The processor 51 may provide a control plane and a user plane. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit, data processing device and/or converter which converts a baseband signal into a radio signal and vice versa. The memory 52 may include read-only memory (ROM), random access memory (RAM), flash memory, memory card, storage medium and/or other storage device. The RF unit 53 includes one or more antennas which transmit and/or receive a radio signal. When the embodiments are implemented in software, the techniques described herein can be implemented with modules (e.g., procedures, functions, and so on) that perform the functions described herein. The modules can be stored in memory 52 and executed by processor 51. The memory 52 can be implemented within the processor 51 or external to the processor 51 in which case those can be communicatively coupled to the processor 51 via various means as is known in the art.

Hereinafter, a method of performing a cell reselection procedure by a UE is described.

If a neighbor cell is an RAT cell different from a serving cell, or if a plurality of neighbor cells are RAT cells different from one another, the UE can perform the cell reselection procedure according to a priority. The priority is determined for the purpose of increasing quality of service (QoS) received by the UE by allowing the UE to reselect a cell having a top priority. The priority may mean a priority among different RATs or a priority among frequencies in the same RAT. The RAT-based priority and the frequency-based priority are assigned by a network operator. Priority information can be provided by a network. The priority information may be broadcast by using system information, or may be provided to a specific UE by using a dedicated signal.

The UE performs the cell reselection procedure by using a reselection timer. If a neighbor cell satisfying reselection criteria exists during a reselection timer interval, the UE reselects the neighbor cell. For example, the reselection criteria may be a condition in which a signal property value of the neighbor cell is greater than a threshold during the reselection timer interval.

The signal property value is received signal strength information measured by the UE if a signal is received from a serving cell or neighbor cells. Examples of the signal property value include a received signal strength indicator (RSSI), received signal code power (RSCP), reference signal received power (RSRP), a path loss criterion parameter, and so on. The received signal strength information used as the signal property value may differ depending on an RAT type. For example, in case of a GSM cell, the UE may measure the path loss criterion parameter as the signal property value. In case of a UTRAN cell, the UE may measure the RSCP as the signal property value. In case of an E-UTRAN cell, the UE may measure the RSRP as the signal property value. A threshold may also differ depending on the RAT type.

If the signal property value of the neighbor cell is greater than the threshold, the reselection timer may be started. If the signal property value of the neighbor cell is less than the threshold while the reselection timer is running, the reselection timer may be stopped. The reselection timer expires if the reselection timer interval elapses after the reselection timer is started.

If the plurality of neighbor cells satisfy the reselection criteria, the UE reselects a cell in a descending order of priority. If the plurality of cells have the same priority, the UE reselects a cell in a descending order of signal property value.

Figure 3:
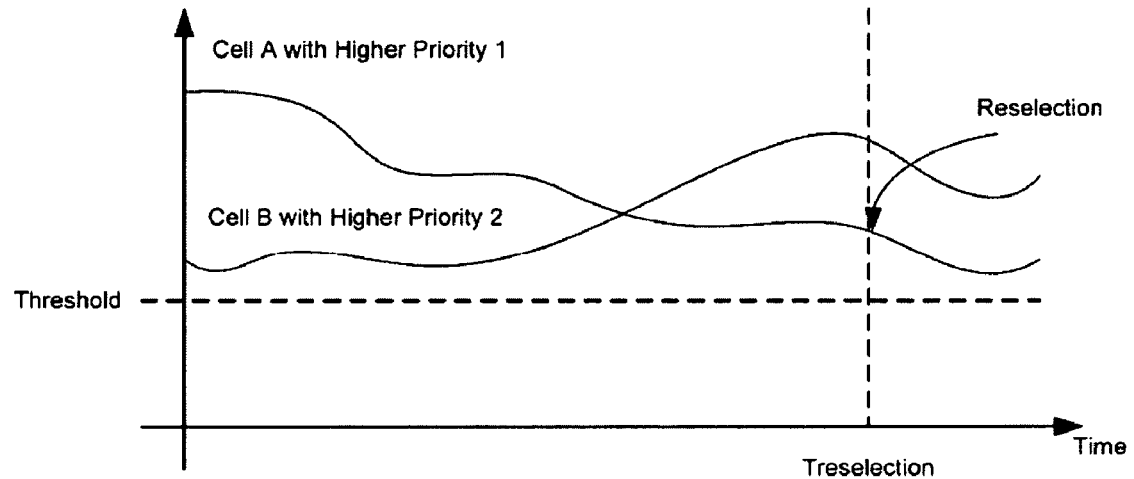
FIG. 3 shows an example of performing a cell reselection procedure by using a reselection timer.

FIG. 3 shows an example of performing a cell reselection procedure by using a reselection timer.

Referring to FIG. 3, a cell A and a cell B have a higher priority than a serving cell, and a priority 1 of the cell A is higher than a priority 2 of the cell B. A signal property value of the cell A and a signal property value of the cell B are greater than a threshold during a reselection timer interval. Both the cell A and the cell B satisfy reselection criteria. The reselection timer expires at Treselection in a time axis. If the cell reselection timer expires, a UE reselects the cell A with a higher priority between the cell A and the cell B.

As such, if a signal property value of one or a plurality of neighbor cells with a higher priority than the serving cell is greater than the threshold during the reselection timer interval, the UE reselects a cell in a descending order of priority. If the plurality of cells have the same priority, the UE reselects a cell in a descending order of signal property value.

If the signal property value of the serving cell is less than the threshold of the serving cell, the UE can reselect a cell as described below.

Figure 4:
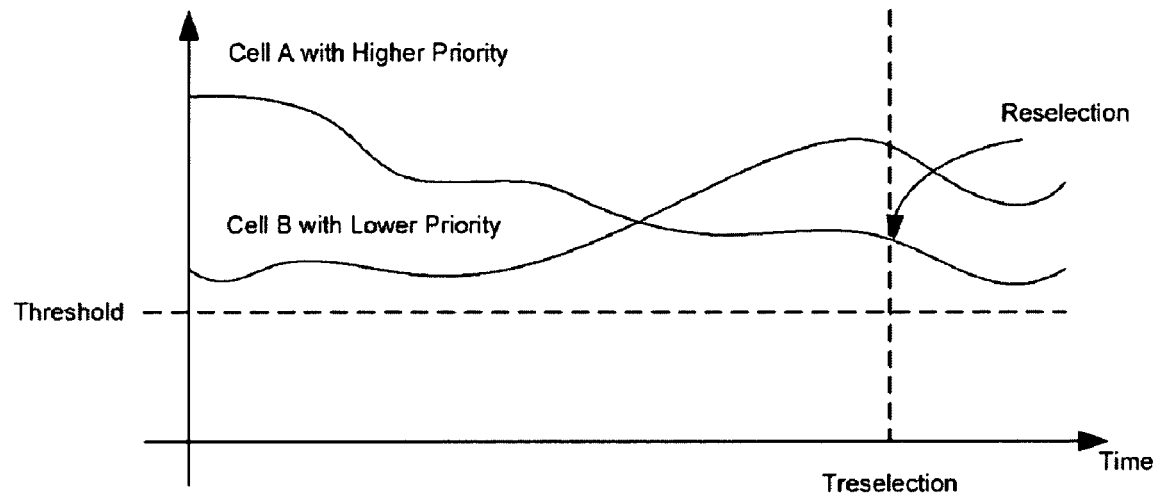
FIG. 4 shows another example of performing a cell reselection procedure by using a reselection timer.

FIG. 4 shows another example of performing a cell reselection procedure by using a reselection timer.

Referring to FIG. 4, a cell A has a higher priority than a serving cell, and a cell B has a lower priority than the serving cell. A signal property value of the cell A and a signal property value of the cell B are greater than a threshold during a reselection timer interval. Both the cell A and the cell B satisfy reselection criteria. The reselection timer expires at Treselection in a time axis. If the cell reselection timer expires, a UE reselects the cell A with a higher priority between the cell A and the cell B.

As such, if a signal property value of the serving cell is less than the threshold of the serving cell, the UE can reselect a cell with a lower priority than the serving cell. If a signal property value of a plurality of neighbor cells with a lower priority than the serving cell is greater than the threshold during the reselection timer interval, the UE reselects a cell in a descending order of priority. If the plurality of cells have the same priority, the UE reselects a cell in a descending order of signal property value.

If the signal property value of the serving cell is less than the threshold, a neighbor cell having a signal property value exceeding the threshold during the reselection timer interval may not exist. In this case, the UE can reselect a cell as described below.

Figure 5:
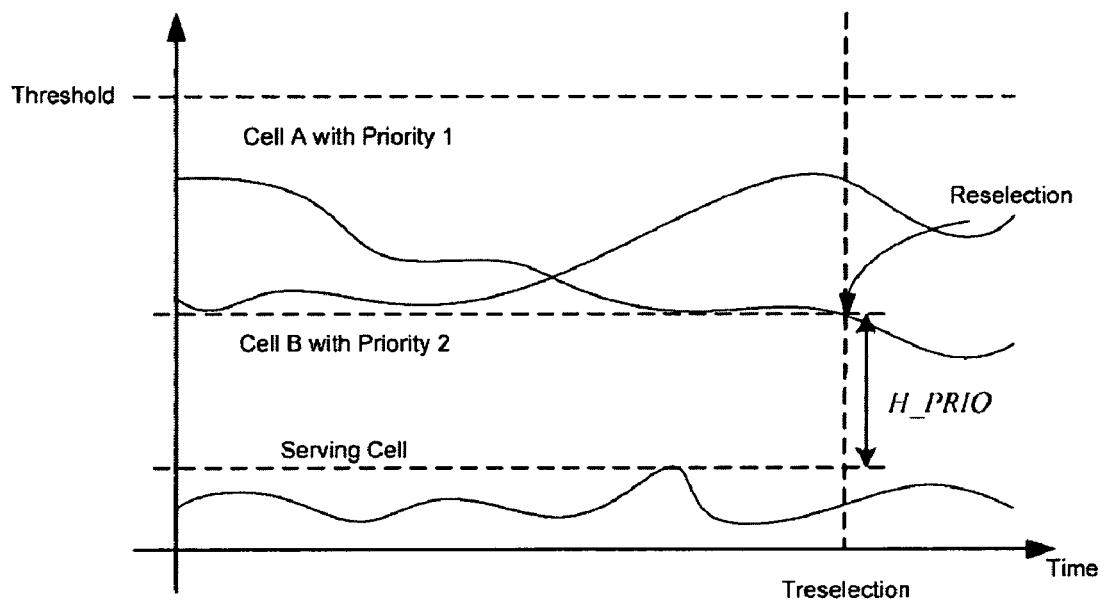
FIG. 5 shows still another example of performing a cell reselection procedure by using a reselection timer.

FIG. 5 shows still another example of performing a cell reselection procedure by using a reselection timer.

Referring to FIG. 5, a cell A has a higher priority than a cell B. The priority of the cell A or the priority of the cell B may be higher or lower than a priority of a serving cell. A signal property value of the cell A and a signal property value of the cell B are less than a threshold during a reselection timer interval. During the reselection timer interval, the signal property value of the cell A and the signal property value of the cell B are greater by a hysteresis H_PRIO than the signal property value of the serving cell. The reselection timer expires at Treselection in a time axis. If the cell reselection timer expires, a UE reselects the cell A with a higher priority between the cell A and the cell B.

As such, if the signal property value of the serving cell is less than the threshold, a neighbor cell having a signal property value exceeding the threshold during the reselection timer interval may not exist. In this case, the UE reselects a cell from neighbor cells having a signal property value greater by at least a specific hystetesis H_PRIO than the signal property value of the serving cell during the reselection timer interval. The UE may reselect a cell in a descending order of priority, or may reselect a cell in a descending order of signal property value. The H_PRIO value may be fixed, or may be transmitted by a network by using a signal.

Figure 6:
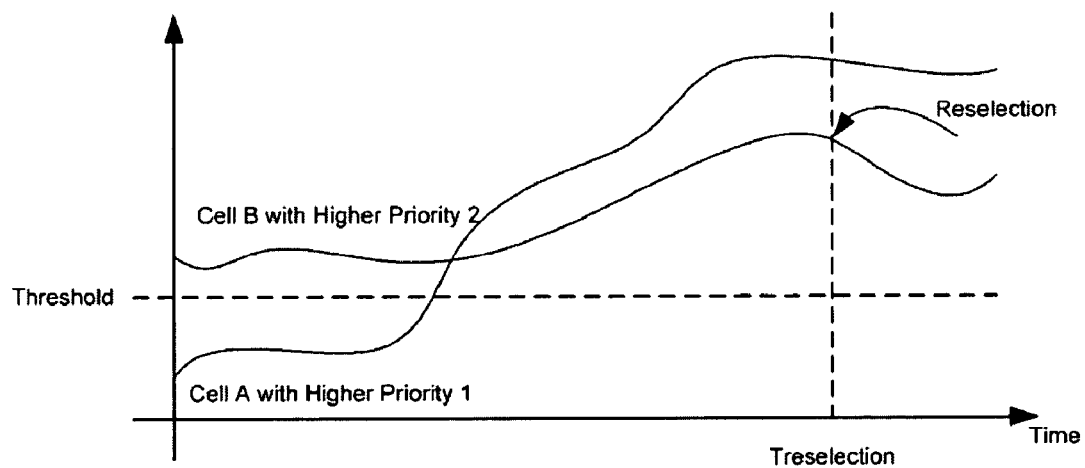
FIG. 6 shows an example of performing a cell reselection procedure if a reselection timer interval is identical irrespective of a priority.
Figure 7:
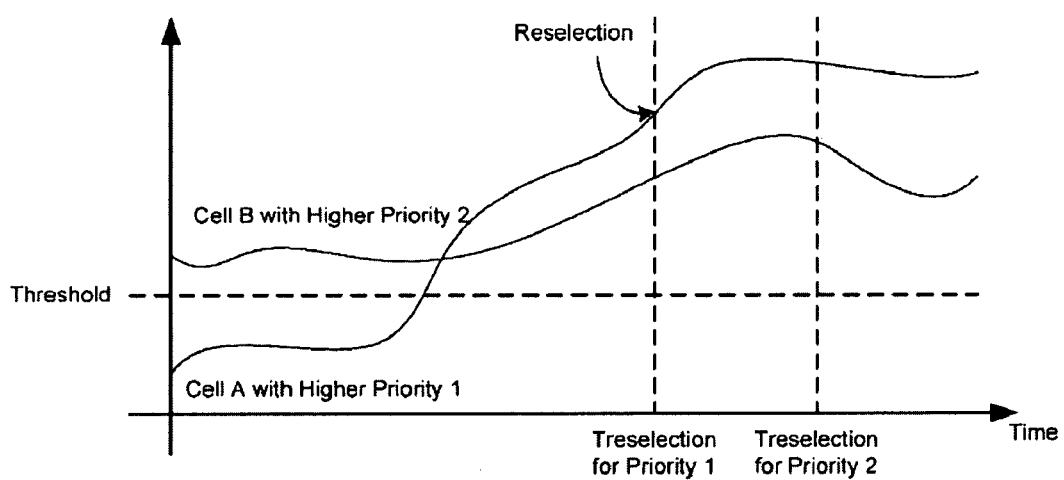
FIG. 7 shows an example of performing a cell reselection procedure if a reselection timer interval differs depending on a priority.
Figure 8:
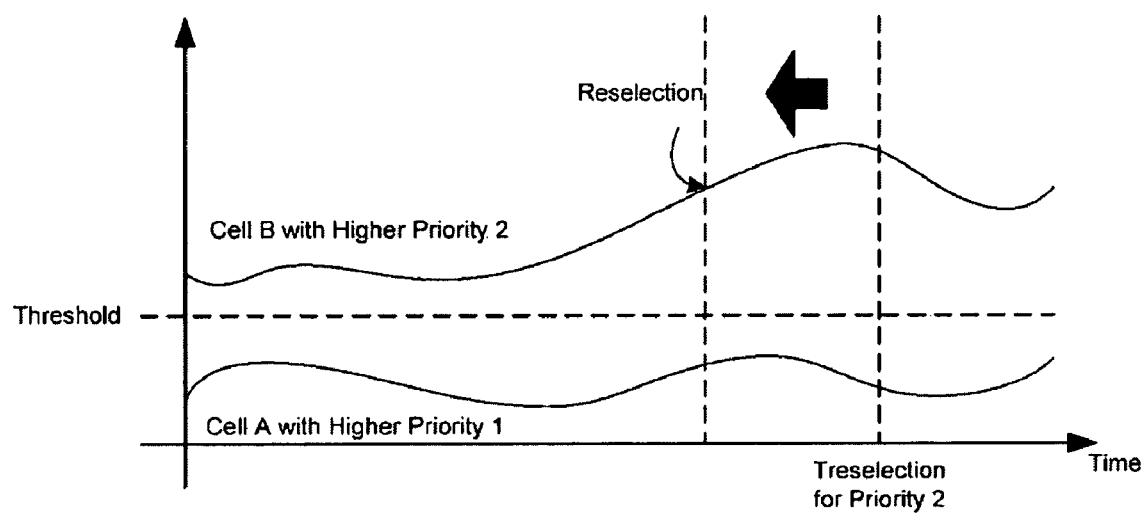
FIG. 8 shows another example of performing a cell reselection procedure if a reselection timer interval differs depending on a priority.

In FIG. 6 to FIG. 8 described below, it is assumed that a cell A and a cell B have a higher priority than a serving cell, and a priority 1 of the cell A is higher than a priority 2 of the cell B.

FIG. 6 shows an example of performing a cell reselection procedure if a reselection timer interval is identical irrespective of a priority.

Referring to FIG. 6, a time at which a signal property value of a cell A is increased to above a threshold is later than a time at which a signal property value of a cell B is increased to above the threshold. That is, a reselection timer of the cell A is started later than a reselection timer of the cell B. Therefore, the reselection timer of the cell B expires before the expiry of the reselection timer of the cell A, and the cell B is reselected.

When the reselection timer of the cell B expires, the signal property value of the cell A is greater than the threshold. Nevertheless, the cell B with a lower priority than the cell A is reselected. This does not conform to the purpose of configuring the priority.

In order for the UE to perform cell reselection by considering the priority, a method of configuring a reselection timer interval differently depending on the priority can be taken into consideration. For example, a reselection timer interval for a higher priority may be configured to be less than a reselection timer interval for a lower priority.

FIG. 7 shows an example of performing a cell reselection procedure if a reselection timer interval differs depending on a priority.

Referring to FIG. 7, a time at which a signal property value of a cell A is increased to above a threshold is later than a time at which a signal property value of a cell B is increased to above the threshold. That is, a reselection timer of the cell A is started later than a reselection timer of the cell B. A reselection timer interval of the cell A is configured to be less than a reselection timer interval of the cell B. The reselection timer of the cell A expires at Treselection for Priority 1 in a time axis, and the reselection timer of the cell B expires at Treselection for Priority 2. That is, the reselection timer of the cell A expires before the expiry of the reselection timer of the cell B, and the cell A is reselected.

FIG. 8 shows another example of performing a cell reselection procedure if a reselection timer interval differs depending on a priority.

Referring to FIG. 8, a signal property value of a cell A does not exceed a threshold before the expiry of a reselection timer of a cell B, i.e., Treselection for Priority 2. The cell B is reselected when the reselection timer of the cell B expires.

If a higher-priority cell having a signal property value exceeding the threshold is not detected before the expiry of the reselection timer of the cell B, the cell B is preferably reselected at an earlier time. This is because the cell B has a higher priority than the serving cell.

Accordingly, there is a need to complement the method of configuring the reselection timer interval differently depending on the priority.

Figure 9:
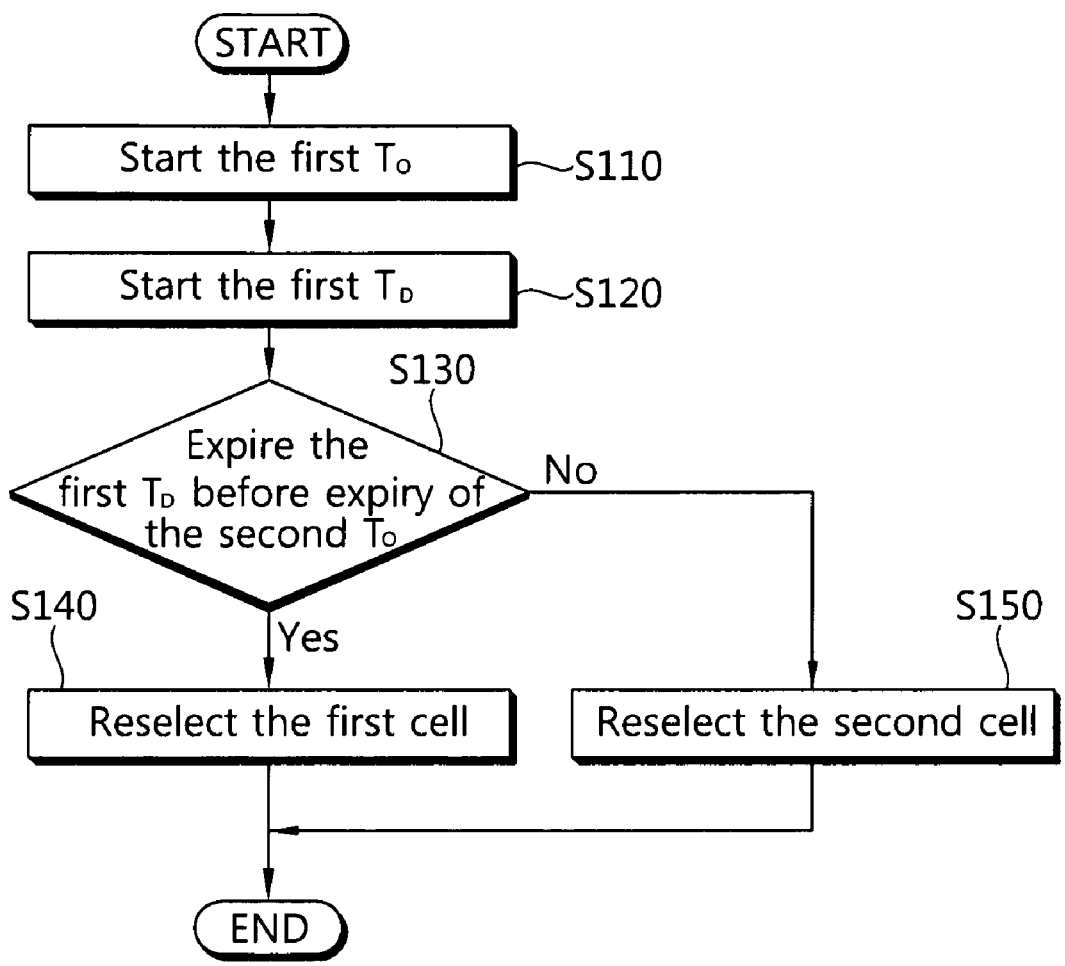
FIG. 9 is a flowchart showing a method of performing a cell reselection procedure according to an embodiment of the present invention.

FIG. 9 is a flowchart showing a method of performing a cell reselection procedure according to an embodiment of the present invention. The method is carried in a UE.

Referring to FIG. 9, the UE starts a first reselection timer $T_0$ (step S110). The first reselection timer is started if a signal property value of a first neighbor cell with a higher priority than a serving cell is increased to above a threshold. The UE can start a second reselection timer while the first reselection timer is running. The second reselection timer may be started if a signal property value of a second neighbor cell with a higher priority than the first neighbor cell is increased to above the threshold.

The UE starts a first delay timer $T_D$ (step S120). The first delay timer is started if the second reselection timer is running at the expiry of the first reselection timer. Herein, the second reselection timer is a reselection timer of the second neighbor cell with a higher priority than the first neighbor cell.

It is determined whether the first delay timer $T_D$ expires before the expiry of the second reselection timer $T_0$ (step S130). If the first delay timer $T_D$ expires before the expiry of the second reselection timer $T_0$, the UE reselects the first neighbor cell as a suitable cell (step S140). If the first delay timer $T_D$ does not expire before the expiry of the second reselection timer $T_0$ but the second reselection timer $T_0$ expires before the expiry of the first delay timer $T_D$, the UE reselects the second neighbor cell as the suitable cell (step S150).

The UE distinguishes a timer for cell reselection into a reselection timer and a delay timer. The timer for cell reselection, i.e., Treselection(p), can be expressed by the following equation.

$$Treselection(p) = T_0 + T_D(p) \quad \text{[Equation 1]}$$

Herein, $T_0$ denotes a reselection timer interval, and $T_D(p)$ denotes a delay timer interval. $T_0$ is a constant value irrespective of a priority, and $T_D(p)$ is determined according to the priority.

The reselection timer interval is constant irrespective of the priority. A delay timer interval with a high priority can be configured to be shorter than a delay timer interval with a low priority.

Reselection timer interval information and delay timer interval information based on the priority can be provided to a UE through signaling of a network. The reselection timer interval and the delay timer interval based on the priority may be stored in a table format in the UE.

In FIG. 10 to FIG. 14 described below, it is assumed that a cell A and a cell B have a higher priority than a serving cell, and a priority 1 of the cell A is higher than a priority 2 of the cell B.

Figure 10:
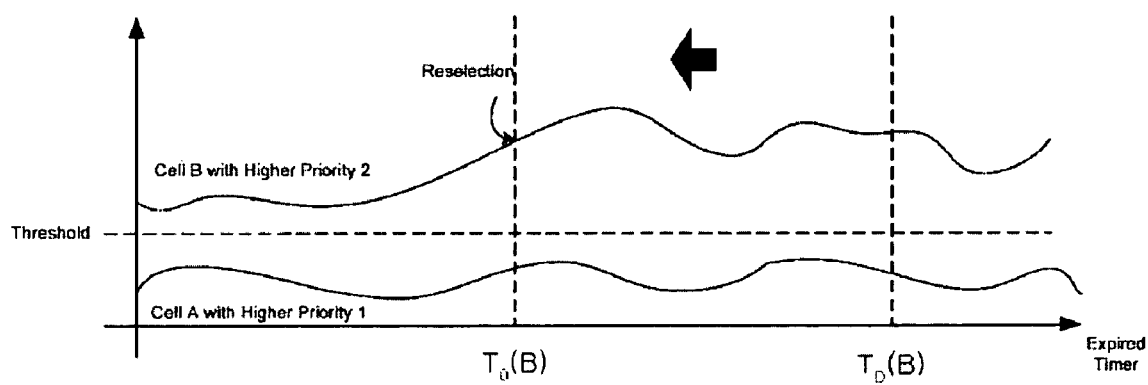
FIG. 10 shows a first example of a cell reselection procedure according to an embodiment of the present invention.

FIG. 10 shows a first example of a cell reselection procedure according to an embodiment of the present invention.

Referring to FIG. 10, a reselection timer of a cell B is started if a signal property value of the cell B is increased to above a threshold. The reselection timer of the cell B expires at $T_0(B)$ in a time axis. When the reselection timer of the cell B expires, there is no cell with a higher priority than the cell B having a signal property value exceeding the threshold. That is, when the reselection timer of the cell B expires, a reselection timer (or delay timer) for a cell with a higher priority than the cell B is not running. In this case, the delay timer of the cell B is not started, and the cell B is directly reselected.

Figure 11:
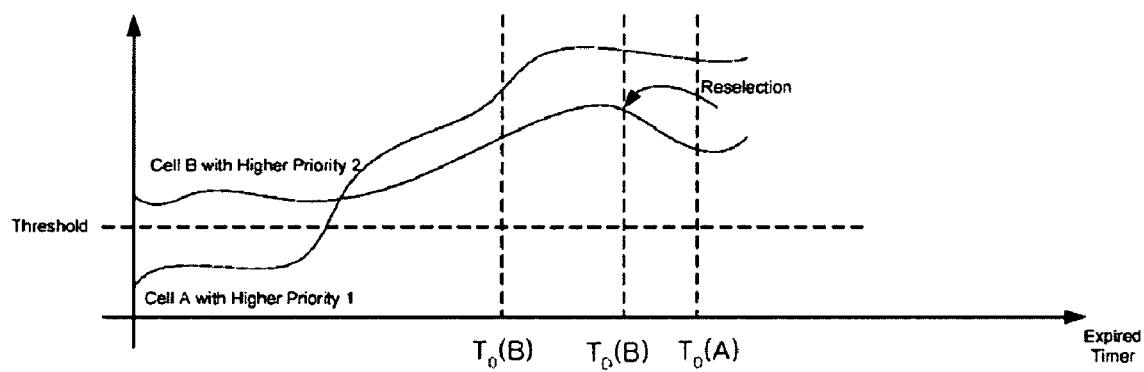
FIG. 11 shows a second example of a cell reselection procedure according to an embodiment of the present invention.

FIG. 11 shows a second example of a cell reselection procedure according to an embodiment of the present invention.

Referring to FIG. 11, when a reselection timer of a cell B expires at $T_0(B)$ in a time axis, there is a cell A with a higher priority than the cell B having a signal property value exceeding a threshold. That is, when the reselection timer of the cell B expires, a reselection timer of the cell A with a higher priority than the cell B is running. In this case, a delay timer of the cell B is started at the expiry of the reselection timer of the cell B. $T_D(B)$ denotes an expiry time of the delay timer of the cell B in the time axis. $T_0(A)$ denotes an expiry time of the reselection timer of the cell A in the time axis. If the delay timer of the cell B expires before the expiry of the reselection timer of the cell A, the cell B is reselected.

Figure 12:
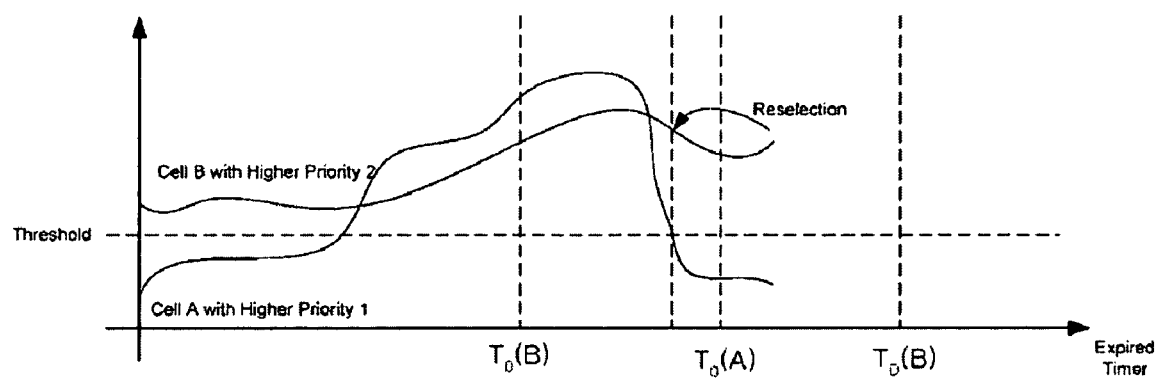
FIG. 12 shows a third example of a cell reselection procedure according to an embodiment of the present invention.

FIG. 12 shows a third example of a cell reselection procedure according to an embodiment of the present invention.

Referring to FIG. 12, when a reselection timer of a cell B expires at $T_0(B)$ in a time axis, there is a cell A with a higher priority than the cell B having a signal property value exceeding a threshold. A delay timer of the cell B is started at the expiry of the reselection timer of the cell B. A signal property value of the cell A is decreased to below the threshold while the reselection timer of the cell A is running. In this case, it is not necessary to delay cell reselection until the expiry of the delay timer of the cell B. Therefore, the cell B can be directly reselected without having to wait for the expiry of the delay timer of the cell B.

Figure 13:
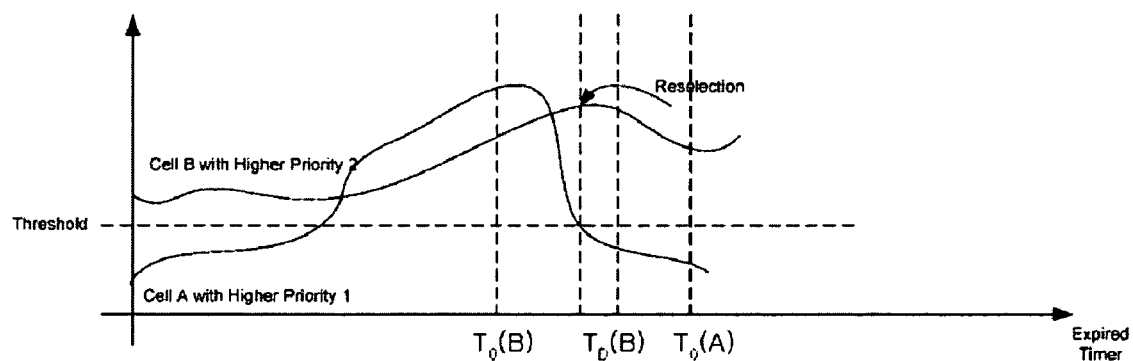
FIG. 13 shows a fourth example of a cell reselection procedure according to an embodiment of the present invention.

FIG. 13 shows a fourth example of a cell reselection procedure according to an embodiment of the present invention.

Referring to FIG. 13, a delay timer of a cell B is started when a reselection timer of the cell B expires at $T_0(B)$ in a time axis. A signal property value of the cell B is decreased to below the threshold while the delay timer of the cell B is running. In this case, a cell A can be directly reselected without having to wait for the expiry of the reselection timer of the cell A.

Figure 14:
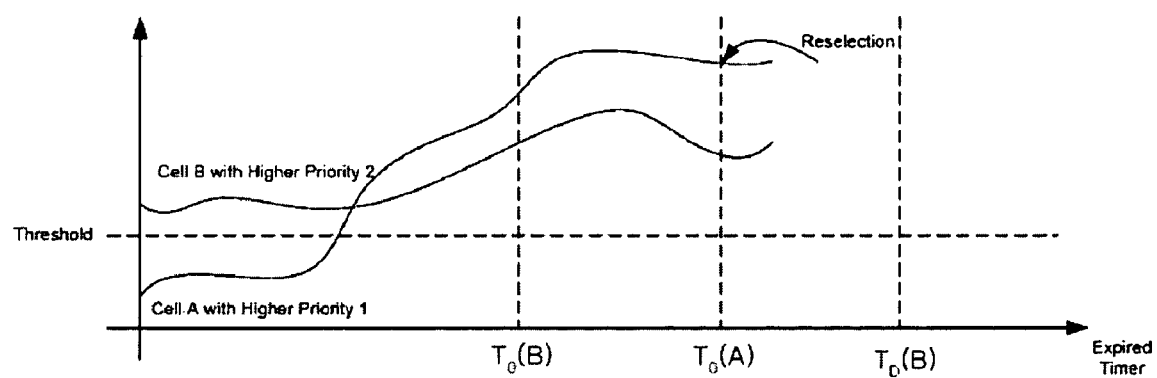
FIG. 14 shows a fifth example of a cell reselection procedure according to an embodiment of the present invention.

FIG. 14 shows a fifth example of a cell reselection procedure according to an embodiment of the present invention.

Referring to FIG. 14, a delay timer of a cell B is started when a reselection timer of the cell B expires at $T_0(B)$ in a time axis. Before the expiry of the delay timer of the cell B, a reselection timer of a cell A expires at $T_0(A)$ in the time axis. When the reselection timer of the cell A expires, there is no cell with a higher priority than the cell A having a signal property value exceeding the threshold. In this case, the cell A is reselected at the expiry of the reselection timer of the cell A.

If there is a cell with a higher priority than the cell A having a signal property value exceeding the threshold when the reselection timer of the cell A expires, the procedures described in FIG. 11 to FIG. 14 are repeated.

As such, a method and an apparatus of effectively performing a cell reselection procedure can be provided. A UE can effectively perform a cell reselection procedure. The UE performs the reselection procedure by distinguishing the timer for cell reselection into a reselection timer having a fixed interval and a delay timer determined by a priority. If a first neighbor cell satisfies reselection criteria during the reselection timer interval, the first neighbor cell is directly reselected if there is no second neighbor cell with a higher priority than the first neighbor cell. If there is the second neighbor cell with a higher priority, cell reselection to the first neighbor cell is sustained. If the second neighbor cell is reselected, a delay occurs by a reselection timer interval and a running time of a delay timer. If the second neighbor cell suddenly does not satisfy threshold criteria while the delay timer is running, the first neighbor cell is reselected after a time delay corresponding to the reselection timer interval and the running time of the delay timer. When the first neighbor cell is reselected at the expiry of the delay timer, a delay occurs by the reselection timer interval and the delay timer interval. Therefore, the UE can perform the cell reselection procedure by considering a priority during a time not exceeding the reselection timer interval and the delay timer interval. The delay timer can prevent the UE from unnecessarily reselecting a cell with a low priority. Therefore, the UE can effectively perform the cell reselection procedure by considering a priority while minimizing a delay. Accordingly, overall system performance can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of performing a cell reselection procedure in a wireless communication system, carried in a user equipment (UE), the method comprising:
   starting a first reselection timer if a signal property value of a first neighbor cell with a higher priority than a serving cell is increased to above a threshold;
   starting a second reselection timer if a signal property value of a second neighbor cell with a higher priority than the first neighbor cell is increased to above the threshold;
   starting a first delay timer if the second reselection timer is running at the expiry of the first reselection timer;
   starting a second delay timer if a third reselection timer that is a reselection timer of a third neighbor cell with a higher priority than the second neighbor cell is running at the expiry of the second reselection timer;
   reselecting the second neighbor cell as a suitable cell if the second reselection timer expires before the expiry of the first delay timer; and
   reselecting the first neighbor cell as the suitable cell if the first delay timer expires before the expiry of the second reselection timer.

2. The method of claim 1, further comprising:
   reselecting the first neighbor cell as the suitable cell if a signal property value of the second neighbor cell is less than the threshold while the second reselection timer is running.

3. The method of claim 1, wherein the first reselection timer and the second reselection timer have the same interval.

4. The method of claim 1, wherein an interval of the first delay timer is determined according to a priority of the first neighbor cell.

5. The method of claim 1, wherein information on the priority is provided by a network.

6. The method of claim 1, wherein the priority is a priority among different radio access technologies (RATs), the RATs which are technology types used in radio access, or a priority among frequencies in the same RAT.

7. The method of claim 6, wherein the RAT is any one of a global system for mobile communication (GSM)/general packet radio service (GPRS), a universal mobile telecommunications system (UMTS) terrestrial radio access network (UTRAN), and evolved-UTRAN (E-UTRAN).

8. The method of claim 7, wherein the RAT of the serving cell is the GSM/GPRS.

9. The method of claim 1, wherein an interval of the second delay timer is shorter than an interval of the first delay timer.

10. An apparatus for a wireless communication, the apparatus comprising:
a radio frequency (RF) unit transmitting and/or receiving a radio signal; and
a processor coupled with the RF unit and configured to:
start a first reselection timer if a signal property value of a first neighbor cell with a higher priority than a serving cell is increased to above a threshold;
starting a second reselection timer if a signal property value of a second neighbor cell with a higher priority than the first neighbor cell is increased to above the threshold;
start a first delay timer if a second reselection timer that is a reselection timer of a second neighbor cell with a higher priority than the first neighbor cell is running at the expiry of the first reselection timer;
starting a second delay timer if a third reselection timer that is a reselection timer of a third neighbor cell with a higher priority than the second neighbor cell is running at the expiry of the second reselection timer;
reselect the second neighbor cell as a suitable cell if the second reselection timer expires before the expiry of the first delay timer; and
reselect the first neighbor cell as the suitable cell if the first delay timer expires before the expiry of the second reselection timer.

\* \* \* \* \*